W. HOCHHAUSEN.
MAGNETO ELECTRIC MACHINE.
No. 181,342. Patented Aug. 22, 1876.
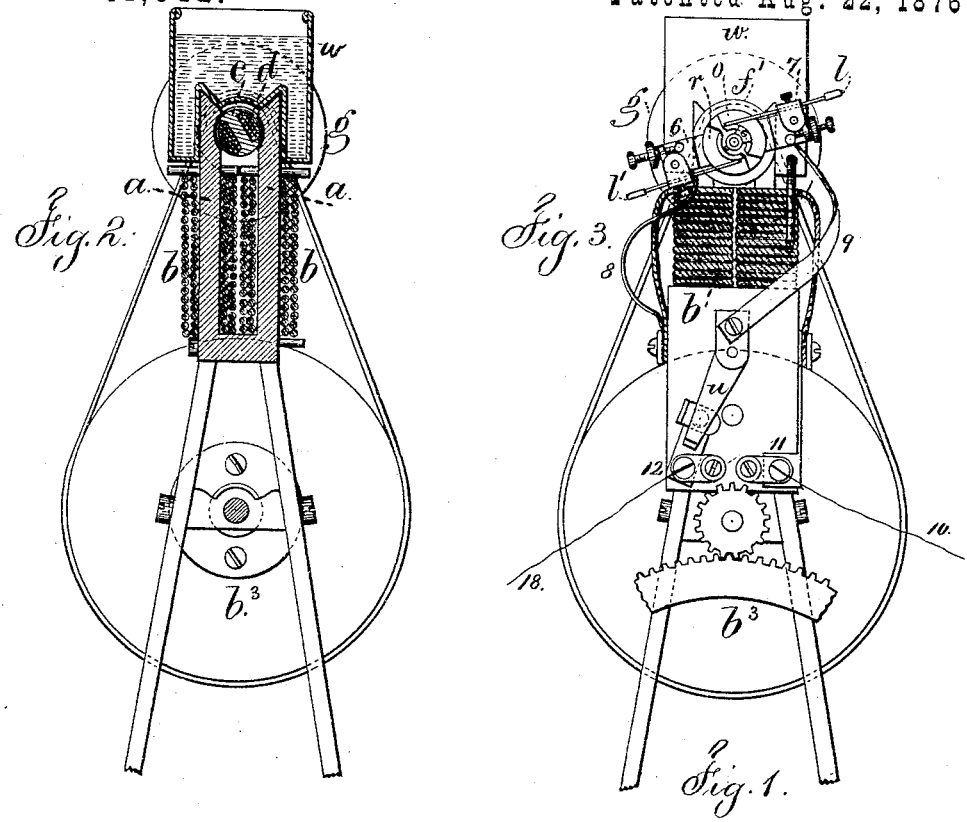
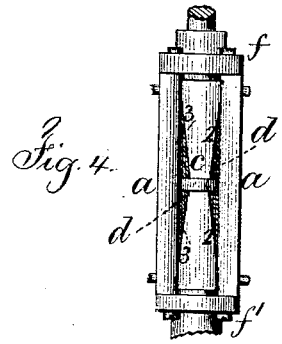
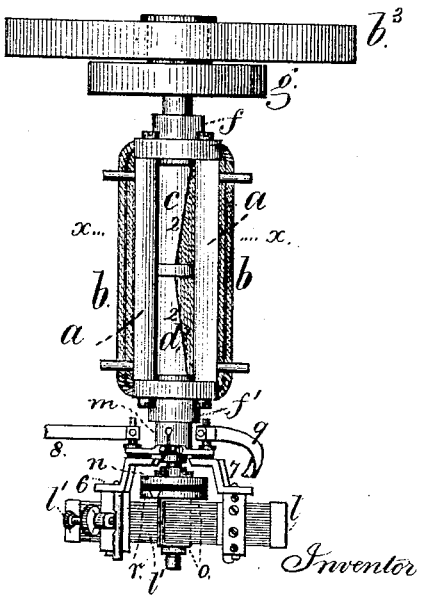
Witnesses
Chas H Smith
Harold Serrell
Inventor
William Hochhausen
per Lemuel W. Serrell
Atty

UNITED STATES PATENT OFFICE.

WILLIAM HOCHHAUSEN, OF NEW YORK, N. Y.

IMPROVEMENT IN MAGNETO-ELECTRIC MACHINES.

Specification forming part of Letters Patent No. 181,342, dated August 22, 1876; application filed July 17, 1876.

*To all whom it may concern:*

Be it known that I, WILLIAM HOCHHAUSEN, of the city and State of New York, have invented an Improvement in Magneto-Electric Machines, of which the following is a specification:

This improvement relates to that class of magneto-electric machines in which an armature is revolved by power between the ends of iron cores, that are polarized by an electric current circulating through insulated helices around the cores. The armature also has a coil or helix around it, and the electrical current is augmented until its maximum force is obtained, and the greatest dynamic effect is produced by the current polarizing the cores, and the cores setting up the current in the helix of the armature, which current circulates in the cores of the electro-magnet, and is also available for other electrical operations, such as plating, telegraphing, &c.

My improvement consists in the peculiar construction of the revolving armature, whereby the magnetism, that becomes a resistance to the revolution of the armature, is less abrupt in its action, and the power required to revolve the machine is very materially lessened.

The bearings of the armature are close to its ends, and attached directly to the iron cores, so as to prevent vibration, and allow of the armature fitting more closely to the cores without the risk of touching. The commutator is movable around a tubular portion of the bearing, so that it may be positioned to insure the greatest electrical effect of the machine under a given speed of revolution. A fly-wheel upon the armature-spindle aids in rendering the revolution uniform, and lessening the inequalities and waste of power consequent upon overcoming the magnetic resistance to the revolution of the armature.

Water has heretofore been employed to keep the electro-magnetic cores and the armature from becoming overheated; but the water is liable to injure the parts by direct contact, and the joints of the supply and discharge tubes are liable to leak.

My improvement consists of a thin metallic water-vessel, of a shape to touch, or nearly touch, the cores and armature, and, being above them, absorbs the heat resulting from the speed of revolution of the armature, and the forcible changes of polarity in the armature.

In the drawing, Figure 1 is a plan of the machine with the water-box removed. Fig. 2 is a vertical section of the same at the line $x\,x$, and Fig. 3 is an end view of the commutator and its connections.

The electro-magnet employed is made of the cores $a$ and coils or helices $b$. The cores project beyond the helices, and the opposite faces of the cores are grooved to form segments of a cylinder, within which the armature $c$ revolves. This armature is grooved longitudinally, so that a section thereof is H-shaped, and the grooves are connected at their ends by mortises, so that the helices $d$, of insulated wire, can be wound into said armature.

The shafts or spindles at the ends of the armature pass through the boxes or bearings $f$ $f'$, that are preferably of brass, and screwed permanently to the edges of the iron cores. By this construction the armature is held firmly in position, but allowed to revolve freely in close proximity to the cores without risk of touching the same.

At one end of the armature-shaft is the fly-wheel $g$, and at the other end the commutator is located.

The peculiarity in the construction of the revolving armature is that its edges are not straight, but formed as double inclines 2 3, (see Fig. 4,) so that less power is required to revolve the armature, because the polarity of the armature is not as suddenly changed as heretofore in passing from one magnetic field to the other.

As the armature revolves, and the faces pass from the field or sphere of one pole to that of the other, the magnetic resistance to the revolution lessens as the inclined edges of the faces pass clear of the cores, and the final magnetic resistance to the revolution is small. At the same time the faces of the armature are wide enough at the widest parts to extend from one core to the other; hence the magnetic tension in the cores will not fall as it would if the armature was not wide enough to act as a keeper.

The commutator is made of the two springs or rows of spring-wires $l\ l'$ set upon the insulated arms 6 7, and these are connected to the springs 8 and 9, and are sustained upon the friction-sleeve $m$, surrounding a tubular projecting hub upon the bearing or box $f'$, so that the commutator-springs can be turned around upon the hub to whatever position they operate best in changing the circuit-connections. I have discovered that the maximum electric effect is obtained by changing the circuit-connections at a later point of the revolution with a rapid speed, and at an earlier point with a slower speed. Upon the armature-shaft is the disk $n$ and the two commutator-segments $o$ and $r$. One of these segments, $o$, is in metallic contact with the shaft, and the other, $r$, is insulated and connected with the end of the insulated wire of the armature-helix. The other end of that helix-wire is connected with the armature-shaft.

The power that is employed to rotate the armature is of any desired character. I have shown the wheel $b^3$ and belt.

The current that is set up in the helix of the armature, in consequence of the same being revolved contiguous to the poles of the electro-magnet $a$, passes through the commutators, the metallic circuit being from one of the line or circuit wires, 10, through the binder 11, helix $b$, of the electro-magnet $a$; thence, by spring 8, insulated commutator-spring $l'$, commutator-segment $o$ or $r$, through the armature-helix and armature-shaft back to $r$ or $o$; thence, by commutator-spring $l$, to the circuit-spring 9 and binder 12 to the line-wire 18.

There may be a switch introduced at $u$, to open or close the circuit; and I remark that the electric current may flow through a bath for plating purposes, or through an electro-magnet, or through any instrument wherever available.

The water-vessel $w$ is made of thin sheet metal, and shaped upon the under surface to fit the upper ends of the stationary magnet, and to be contiguous to the revolving armature, but not to touch the same. The water in this will circulate by the action of the heat of the parts beneath it, and convey away the heat, so as to prevent the parts becoming too hot. The water may also be changed from time to time, as required.

I claim as my invention—

1. In a magneto-electric machine, a revolving armature with the edges of the faces at an inclination to the edges of the stationary magnet, for the purposes set forth.

2. The commutator-springs $l\ l'$ upon the friction-sleeve $m$, in combination with the tubular bearing and the shaft of the revolving armature and the commutator-segments $o\ r$, substantially as set forth.

3. In a magneto-electric machine, a revolving armature, in combination with bearings for the shaft of the armature attached directly to the edges of the cores of the magnets, substantially as set forth.

4. In a magneto-electric machine, the combination, with the revolving armature and stationary magnet, of a water-vessel, made of metal, and shaped to fit the said parts, or nearly so, for the purposes, and as set forth.

Signed by me this 12th day of July, A. D. 1876.

W. HOCHHAUSEN.

Witnesses:
   GEO. T. PINCKNEY,
   CHAS. H. SMITH.